United States Patent
Nagai et al.

(10) Patent No.: US 12,105,066 B2
(45) Date of Patent: Oct. 1, 2024

(54) PREPARATIVE LIQUID CHROMATOGRAPH AND ANALYSIS METHOD

(71) Applicant: SHIMADZU CORPORATION, Kyoto (JP)

(72) Inventors: Yusuke Nagai, Kyoto (JP); Yohei Toji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 148 days.

(21) Appl. No.: 17/669,909

(22) Filed: Feb. 11, 2022

(65) Prior Publication Data
US 2022/0299485 A1    Sep. 22, 2022

(30) Foreign Application Priority Data
Mar. 16, 2021 (JP) .................... 2021-042393

(51) Int. Cl.
*G01N 30/82* (2006.01)
*G01N 30/10* (2006.01)
(Continued)

(52) U.S. Cl.
CPC ............. *G01N 30/82* (2013.01); *G01N 30/10* (2013.01); *G01N 2030/027* (2013.01); *G01N 30/80* (2013.01)

(58) Field of Classification Search
CPC ............. G01N 30/10; G01N 30/80–84; G01N 2030/027; G01N 2030/8405–8494;
(Continued)

(56) References Cited

U.S. PATENT DOCUMENTS 4,174,772 A * 11/1979 Neuss .................... G01N 30/74
435/288.6
7,267,796 B2 * 9/2007 Waki ...................... G01N 30/82
422/89
(Continued)

FOREIGN PATENT DOCUMENTS

CN      206431103 U      8/2017
JP      H0472560 A       3/1992
(Continued)

OTHER PUBLICATIONS

Office Action for corresponding Chinese Patent Application No. 202210123549.4 dated Aug. 17, 2023, with English machine translation.
(Continued)

*Primary Examiner* — Justin N Olamit
(74) *Attorney, Agent, or Firm* — Renner, Otto, Boisselle & Sklar, LLP

(57) ABSTRACT

A preparative liquid chromatograph includes a liquid feeding pump (2) that feeds a mobile phase, an injector (4) that injects a sample into the mobile phase at a downstream of the liquid feeding pump (2), a separation column (6) for separating components in the sample injected into the mobile phase by the injector (4) at a downstream of the injector (4), and an eluate fractionator (8) configured to divide a flow of the eluate from the separation column (6) into a flow of a minute flow rate and another flow at a downstream of the separation column (6) and to extract at least a part of an eluate that forms the flow of a minute flow rate into an fractionation container (22).

4 Claims, 2 Drawing Sheets

(51) Int. Cl.
*G01N 30/02* (2006.01)
*G01N 30/80* (2006.01)

(58) Field of Classification Search
CPC .... B01D 15/24; B01D 15/242; B01D 15/245; B01D 15/247
See application file for complete search history.

(56) References Cited

U.S. PATENT DOCUMENTS

| | | |
|---|---|---|
| 10,695,692 B2 * | 6/2020 | Wikfors ................ B01D 15/40 |
| 2004/0238427 A1 | 12/2004 | Maruyama et al. |
| 2015/0192590 A1 | 7/2015 | Sodeoka |
| 2016/0161454 A1 * | 6/2016 | Jones .................... B01D 11/04 |
| | | 210/511 |
| 2019/0391117 A1 | 12/2019 | Yamazaki |

FOREIGN PATENT DOCUMENTS

| | | |
|---|---|---|
| JP | H11258224 A | 9/1999 |
| JP | 2002311009 A | 10/2002 |
| JP | 2005017226 A | 1/2005 |
| WO | 2014/027652 A1 | 2/2014 |

OTHER PUBLICATIONS

Decision of Rejection for corresponding Chinese Patent Application No. 202210123549.4 dated Jan. 16, 2024, with English machine translation.
Office Action for corresponding Japanese Patent Application No. 2021-042393 dated Mar. 5, 2024, with English machine translation.

* cited by examiner

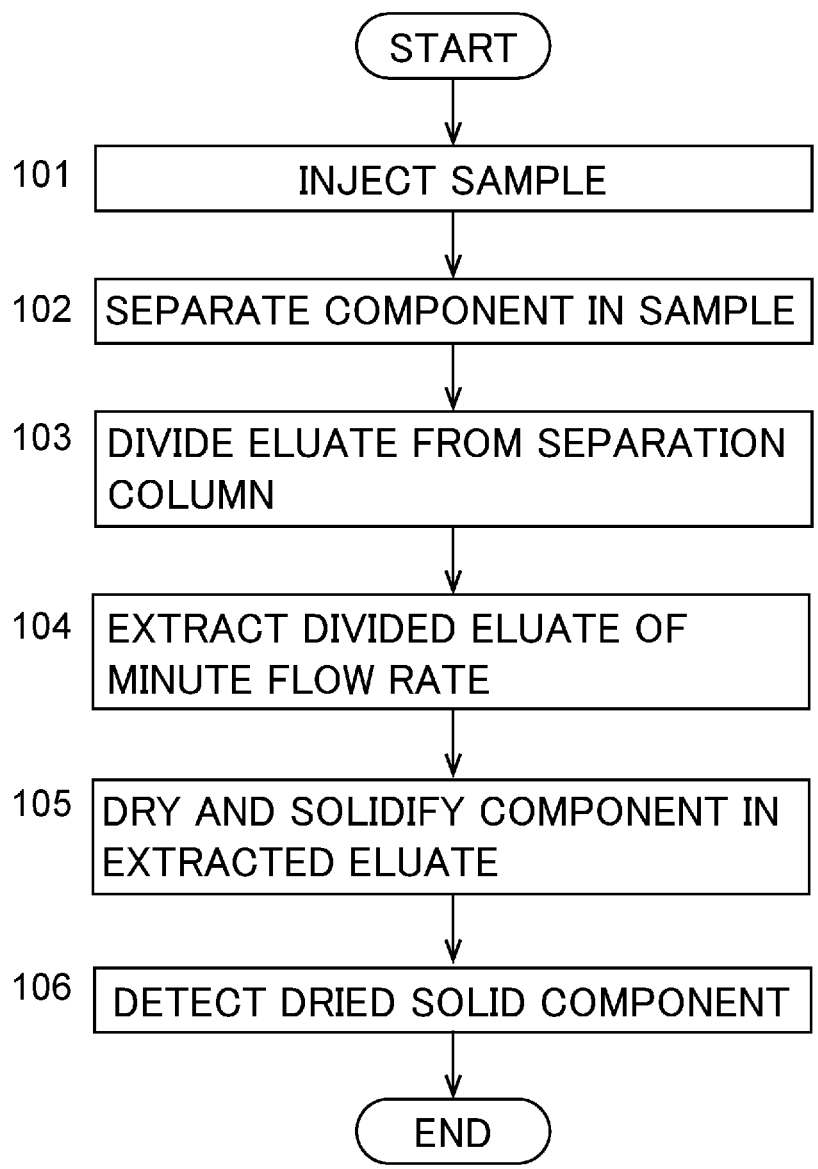

PREPARATIVE LIQUID CHROMATOGRAPH AND ANALYSIS METHOD

BACKGROUND OF THE INVENTION

1. Field of the Invention

The present invention relates to a preparative liquid chromatograph and an analysis method.

2. Description of the Related Art

A detector using vibrational spectroscopy such as infrared spectroscopy or Raman spectroscopy is known, and it has been proposed to combine such a detector with a liquid chromatograph (hereinafter, LC) (see WO 2014/027652 A). In the case of combining Raman spectroscopy with an LC, there is a method in which an eluate from a separation column of an LC is extracted into a plate or the like, a solvent of the extracted eluate is removed to dry the eluate, and then Raman measurement is performed. In such a case, it is preferable to reduce the amount of solvent in order to quickly dry the eluate extracted into a plate or the like. Therefore, as the LC, one having a very small mobile phase flow rate such as a nano liquid chromatograph (hereinafter, nano LC) is used.

SUMMARY OF THE INVENTION

As described above, to perform liquid chromatography analysis with a detector using vibrational spectroscopy, it is necessary to use an LC having a very small mobile phase flow rate, such as a nano LC. However, it is not easy to control the flow rate of the mobile phase with high accuracy in the order of nL/min, and there is a problem of liquid feeding stability such as generation of pulsation. In addition, the number of kinds of separation columns that can be used in the nano LC is smaller than that of LCs or the like having a flow rate of several hundred μL/min to several mL/min order, which are called conventional LCs, and there is a limitation on the kinds of substances that can be separated.

The present invention has been made in view of the above problems, and an object of the present invention is to make it possible to combine a detector using vibrational spectroscopy with an LC having a larger mobile phase flow rate than a nano LC.

A preparative liquid chromatograph according to the present invention includes a liquid feeding pump that feeds a mobile phase, an injector that injects a sample into the mobile phase at a downstream of the liquid feeding pump, a separation column for separating components in the sample injected into the mobile phase by the injector at a downstream of the injector, and an eluate fractionator configured to divide a flow of the eluate from the separation column into a flow of a minute flow rate and another flow at a downstream of the separation column and to extract at least a part of an eluate that forms the flow of a minute flow rate into an fractionation container. In the eluate fractionator, the eluate that has been extracted may be dried and solidified. An eluate drying/solidifying unit for drying and solidifying the eluate may be separately provided.

An analysis method according to the present invention includes an injection step of injecting a sample into a mobile phase that flows at a predetermined flow rate, a separation step of separating components in the sample injected into the mobile phase in the injection step from each other using a separation column, a flow dividing step of dividing a flow of an eluate from the separation column into a flow of a minute flow rate and another flow, an extraction step of extracting at least a part of the eluate that forms the flow of a minute flow rate divided in the dividing step into an fractionation container, a drying/solidifying step of drying the eluate extracted into the fractionation container in the extraction step to dry and solidify a component in the eluate, and a detection step of detecting the component dried and solidified in the drying/solidifying step.

According to the preparative liquid chromatograph of the present invention, the liquid chromatograph includes the eluate fractionator configured to extract the flow of the eluate from the separation column into a flow of a minute flow rate and the other flow at the downstream of the separation column and extract at least a part of the eluate forming the flow of a minute flow rate into the fractionation container, and therefore the eluate from the separation column can be guided to the fractionation container at a minute flow rate without setting the flow rate of the mobile phase to be supplied to the separation column to a minute flow rate of the order of nL/min. This enables a combination of a detector using vibrational spectroscopy with an LC having a larger mobile phase flow rate than a nano LC. Because the liquid feeding flow rate of the mobile phase is larger than that of a nano LC, liquid feeding stability is obtained as compared with a nano LC. In addition, a kind of separation column that cannot be used in a nano LC can also be used.

According to the analysis method of the present invention, the flow of the eluate from the separation column is divided into a flow of a minute flow rate and the other flow, at least a part of the eluate that forms the flow of a minute flow rate is extracted into the fractionation container, the eluate extracted into the fractionation container is dried to dry and solidify a component in the eluate, and the dried solid component is detected, which enables an analysis with a combination of a detector using vibrational spectroscopy with an LC having a larger mobile phase flow rate than a nano LC.

BRIEF DESCRIPTION OF THE DRAWINGS

FIG. 2 is a flowchart showing an example of an analysis method using the preparative liquid chromatograph of the embodiment.

DETAILED DESCRIPTION OF THE INVENTION

Figure 1:
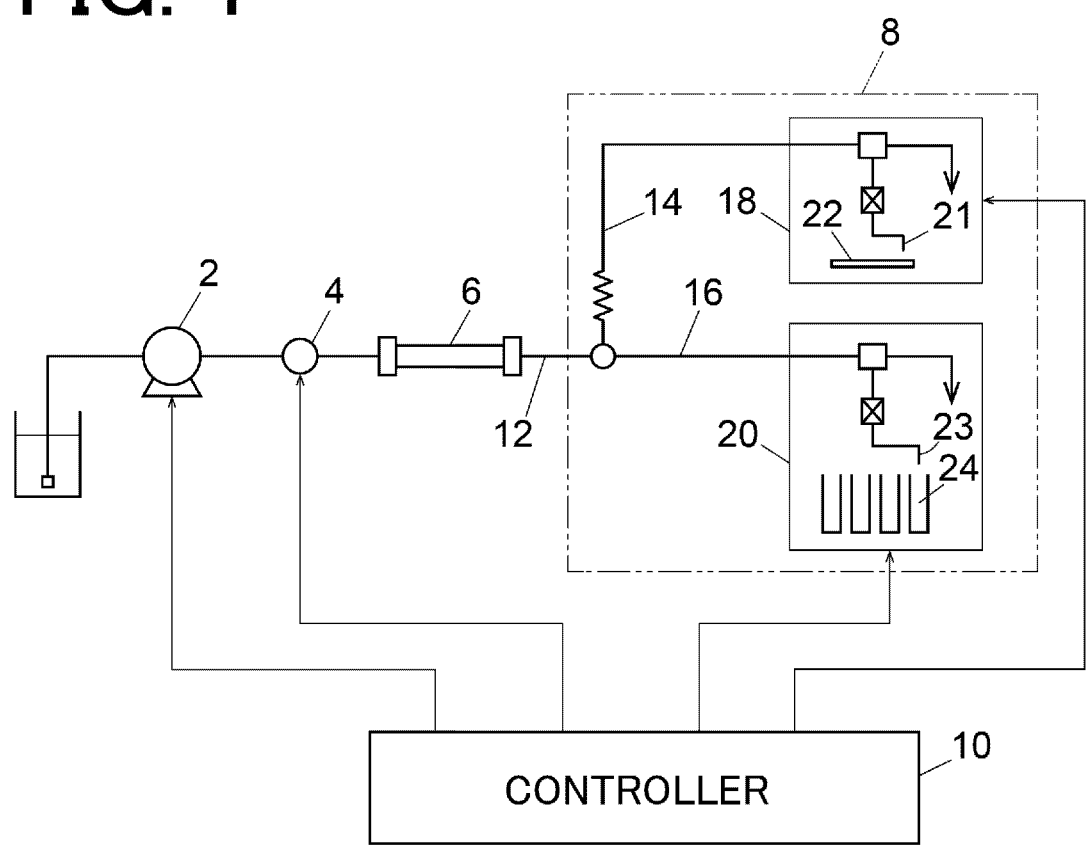
FIG. 1 is a schematic configuration diagram showing an embodiment of a preparative liquid chromatograph.

Hereinafter, an embodiment of a preparative liquid chromatograph and an analysis method according to the present invention will be described with reference to the drawings.

As shown in FIG. 1, the preparative liquid chromatograph of this embodiment includes a liquid feeding pump 2, an injector 4, a separation column 6, an eluate fractionator 8, and a controller 10.

The liquid feeding pump 2 feeds a mobile phase. The injector 4 is provided downstream of the liquid feeding pump 2 and injects a sample into the mobile phase fed by the liquid feeding pump 2. The separation column 6 is provided downstream of the injector 4, and components in the sample injected into the mobile phase by the injector 4 are separated from each other in the separation column 6.

The eluate fractionator 8 is provided downstream of the separation column 6. The eluate fractionator 8 includes a first channel 14 and a second channel 16 branched from each other from a channel 12 on the outlet side of the separation column 6 and divides the flow of the eluate from the separation column 6 into a "flow of a minute flow rate" flowing through the first channel 14 and an "other flow" flowing through the second channel 16. The split ratio between the first channel 14 and the second channel 16 is, for example, 10 times or more, and the flow rate of the eluate flowing through the first channel 14 is, for example, 10 μL/min or less. The first channel 14 communicates with a first fractionator 18, and the second channel 16 communicates with a second fractionator 20.

The first fractionator 18 is configured to drop the eluate forming the "flow of a minute flow rate" in the first channel 14 from the tip of a nozzle 21 and extract the eluate into a plate 22 which is an fractionation container. A plurality of wells (eluate holding parts) are provided on the upper surface of the plate 22. Although not shown, the first fractionator 18 includes a mechanism for moving the nozzle 21 and/or the plate 22 in a planar manner and drops the eluate from the separation column 6 from the nozzle 21 to a predetermined well of the plate 22.

The second fractionator 20 is configured to drop the eluate forming the "other flow" in the second channel 16 from the tip of a nozzle 23 and extract the eluate into a collection container 24. A plurality of collection containers 24 are arrayed in a planar manner in the second fractionator 20, and the eluate from the separation column 6 is dropped from the nozzle 23 to a predetermined collection container 24.

The controller 10 controls the operations of the liquid feeding pump 2, the injector 4, and the eluate fractionator 8. The controller 10 can be realized by a computer device including a central processing unit (CPU), a storage memory, and the like. A target portion to be extracted in the eluate from the separation column 6 can be set in advance by a user to the controller 10. The number of the target portion to be extracted may be plural.

The controller 10 is configured to control the operations of the first fractionator 18 and the second fractionator 20 such that the target portion set by the user is extracted into each of the plate 22 of the first fractionator 18 and the collection container 24 of the second fractionator 20. When the user sets a plurality of target portions, eluates each corresponding to each of a plurality of fractions extracted into the plurality of wells of the plate 22 of the first fractionator 18 (eluate containing the same component as the corresponding fraction) are collected in individual collection containers 24 of the second fractionator 20 different from each other. Although not shown in FIG. 1, a detector for detecting the sample separated by the separation column 6 may be provided on the channel 12 downstream of the separation column 6.

In such a case, the controller 10 can control the operations of the first fractionator 18 and the second fractionator 20 based on a detection signal obtained by the detector provided on the channel 12. As the detector for detecting the separated sample, a PDA detector, a fluorescence detector, or the like is used.

The controller 10 is configured to store a correspondence relationship between the target portion extracted into the plate 22 in the first fractionator 18 and the target portion extracted into the collection container 24 in the second fractionator 20, that is, a correspondence relationship between the position of the well and the position of the collection container 24 where the same target portion is extracted in a predetermined storage region. The component contained in the target portion extracted into each well of the plate 22 is subjected to a drying and solidifying treatment for removing the solvent, and then supplied to a detector using vibrational spectroscopy such as a Raman spectrometer to be detected. The target portion collected in the collection container 24 is used when the component detected by the detector using vibrational spectroscopy needs to be further analyzed.

An example of an analysis method using the above-described preparative liquid chromatograph will be described with reference to FIG. 1 and the flowchart of FIG. 2.

The injector 4 injects a sample to be analyzed into a mobile phase (step 101). The sample injected into the mobile phase is guided to the separation column 6, and components in the sample are separated from each other (step 102). The eluate from the separation column 6 is divided into the first channel 14 and the second channel 16 at the downstream of the separation column 6, and a flow of the eluate of a minute flow rate is formed in the first channel 14 (step 103). A preset target portion of the eluate forming the flow of a minute flow rate in the first channel 14 is extracted into the plate 22 in the first fractionator 18 (step 104).

After the target portion of the eluate from the separation column 6 is extracted into the plate 22, the plate 22 is heated or the like to dry and solidify the component contained in the target portion (step 105), and the component is detected by a detector such as a Raman spectrometer (step 106).

The example described above is merely an example of the embodiment of the preparative liquid chromatograph and the analysis method according to the present invention. The embodiment of a preparative liquid chromatograph according to the present invention is as follows.

An embodiment of the preparative liquid chromatograph according to the present invention includes a liquid feeding pump that feeds a mobile phase, an injector that injects a sample into the mobile phase at a downstream of the liquid feeding pump, a separation column for separating components in the sample injected into the mobile phase by the injector at a downstream of the injector, and an eluate fractionator configured to divide a flow of the eluate from the separation column into a flow of a minute flow rate and another flow at a downstream of the separation column and to extract at least a part of an eluate that forms the flow of a minute flow rate into an fractionation container.

In a specific aspect of the embodiment, the eluate fractionator has a first channel and a second channel that are branched from each other at the downstream of the separation column, the eluate that forms the flow of a minute flow rate flows through the first channel, an eluate that forms the other flow flows through the second channel, and the eluate that has passed through the first channel is extracted by being dropped to the fractionation container.

In the specific aspect, the eluate fractionator may be configured to collect the eluate that has passed through the second channel in a collection container. Such a form enables the eluate collected in the collection container to be used for reanalysis or the like of the component extracted into the fractionation container and detected by a Raman spectrometer or the like.

In the above case, the preparative liquid chromatograph may include a controller configured to extract a plurality of portions of the eluate that has passed through the first channel into the fractionation container by controlling an operation of the eluate fractionator and to separately collect portions each corresponding to each of the plurality of portions extracted into the fractionation container in the eluate that has passed through the second channel into the collection container different from each other.

In the above case, a plurality of eluate holding parts for holding the eluate dropped from the eluate fractionator are arrayed in a planar manner in the fractionation container, and the controller is configured to store a correspondence relationship between each of the eluate holding parts in which each of the plurality of portions extracted in the fractionation container is held and each collection container in which each portion corresponding to each of the plurality of portions in the eluate that has passed through the second channel is collected.

An embodiment of the analysis method according to the present invention includes an injection step of injecting a sample into a mobile phase that flows at a predetermined flow rate, a separation step of separating components in the sample injected into the mobile phase in the injection step from each other using a separation column, a flow dividing step of dividing a flow of an eluate from the separation column into a flow of a minute flow rate and another flow, an extraction step of extracting at least a part of the eluate that forms the flow of a minute flow rate divided in the dividing step into an fractionation container, a drying/solidifying step of drying the eluate extracted into the fractionation container in the extraction step to dry and solidify a component in the eluate, and a detection step of detecting the component dried and solidified in the drying/solidifying step.

DESCRIPTION OF REFERENCE SIGNS

2: liquid feeding pump
4: injector
6: separation column
8: eluate fractionator
10: controller
12: channel at downstream of separation column
14: first channel
16: second channel
18: first fractionator
20: second fractionator
21, 23: nozzle
22: fractionation container
24: collection container

What is claimed is:
1. A preparative liquid chromatograph comprising:
a liquid feeding pump that feeds a mobile phase;
an injector that injects a sample into the mobile phase at a downstream of the liquid feeding pump;
a separation column for separating components in the sample injected into the mobile phase by the injector at a downstream of the injector; and
an eluate fractionator configured to divide a flow of the eluate from the separation column into a first flow and a second flow having a larger flow rate than the first flow at a downstream of the separation column and to extract at least a part of an eluate that forms the first flow into a fractionation container, wherein:
the eluate fractionator has a first channel and a second channel that are branched from each other at the downstream of the separation column, the eluate that forms the first flow flows through the first channel, and eluate that forms the second flow flows through the second channel, and the eluate that has passed through the first channel is extracted by being dropped to the fractionation container,
the eluate fractionator is configured to collect the eluate that has passed through the second channel in a collection container,
the preparative liquid chromatograph includes a controller configured to extract a plurality of portions of the eluate that has passed through the first channel into the fractionation container by controlling an operation of the eluate fractionator and to separately collect portions each corresponding to each of the plurality of portions extracted into the fractionation container in the eluate that has passed through the second channel into the collection container different from each other,
a plurality of eluate holding parts for holding the eluate dropped from the eluate fractionator are arrayed in a planar manner in the fractionation container, and
the controller is configured to store a correspondence relationship between each of the eluate holding parts in which each of the plurality of portions extracted in the fractionation container is held and each collection container in which each portion corresponding to each of the plurality of portions in the eluate that has passed through the second channel is collected.

2. The preparative liquid chromatograph according to claim 1, wherein the flow rate of the first flow is 10 μL/min or less.

3. The preparative liquid chromatograph according to claim 1, wherein the flow rate of the second flow is 10 times or more of the flow rate of the first flow.

4. The preparative liquid chromatograph according to claim 1, wherein the fractionation container is a plate.

* * * * *